US009529403B2

(12) United States Patent
Gulati et al.

(10) Patent No.: US 9,529,403 B2
(45) Date of Patent: *Dec. 27, 2016

(54) METHOD AND APPARATUS FOR PROVIDING TELEMETRY FOR POWER MANAGEMENT FUNCTIONS

(71) Applicant: Apple Inc., Cupertino, CA (US)

(72) Inventors: Manu Gulati, Saratoga, CA (US); Parin Patel, San Francisco, CA (US); Keith Cox, Sunnyvale, CA (US); Derek Iwamoto, Sunnyvale, CA (US); Cyril de la Cropte de Chanterac, San Francisco, CA (US); Christopher J. Young, San Jose, CA (US)

(73) Assignee: Apple Inc., Cupertino, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 14/466,205

(22) Filed: Aug. 22, 2014

(65) Prior Publication Data

US 2016/0054773 A1 Feb. 25, 2016

(51) Int. Cl.
*G06F 1/32* (2006.01)

(52) U.S. Cl.
CPC ........... *G06F 1/3203* (2013.01); *G06F 1/3296* (2013.01)

(58) Field of Classification Search
CPC .............................. G06F 1/3203; G06F 1/3296
See application file for complete search history.

(56) References Cited

U.S. PATENT DOCUMENTS

| 8,782,454 B2 | 7/2014 | Heller et al. |
| 2009/0072810 A1 | 3/2009 | Lee et al. |
| 2009/0204831 A1* | 8/2009 | Cousson ............... G06F 1/3203 713/322 |
| 2010/0213919 A1* | 8/2010 | Takayanagi ............. G06F 1/206 323/318 |
| 2011/0099395 A1* | 4/2011 | Richards, III ............ G06F 1/26 713/310 |
| 2012/0054511 A1* | 3/2012 | Brinks ....................... G06F 1/26 713/310 |
| 2012/0072743 A1 | 3/2012 | Lee et al. |
| 2012/0226929 A1 | 9/2012 | Lee |

(Continued)

*Primary Examiner* — Jaweed A Abbaszadeh
*Assistant Examiner* — Cheri Harrington
(74) *Attorney, Agent, or Firm* — Meyertons, Hood, Kivlin, Kowert & Goetzel, P.C.; Eric A. Heter

(57) ABSTRACT

A method and apparatus for providing telemetry for use in power control functions is disclosed. A system includes an integrated circuit (IC) having a first power management circuit. The IC also includes a number of functional circuit blocks within a number of different power domains. A second power management circuit is implemented external to the IC and includes a number of voltage regulators. Each of the power domains is coupled to receive power from one voltage regulators. During operation, the first power management circuit may send commands requesting the change of one or more voltages provided to the IC. The second power management circuit may respond by performing the requested voltage change(s), and may also provide telemetry data to the first power management circuit. The second power management circuit may also provide telemetry data responsive to receiving a no operation command from the first power management circuit.

19 Claims, 8 Drawing Sheets

(56) References Cited

U.S. PATENT DOCUMENTS

2013/0173938 A1* 7/2013 Yang .................. G06F 1/26
          713/300
2013/0173946 A1* 7/2013 Rotem ............... G06F 1/3206
          713/340

* cited by examiner

METHOD AND APPARATUS FOR PROVIDING TELEMETRY FOR POWER MANAGEMENT FUNCTIONS

BACKGROUND

Technical Field

This disclosure relates to electronic systems, and more particularly, to balancing power consumption and performance on integrated circuits used in electronic system.

Description of the Related Art

Managing power consumption in electronic systems has taken on a greater importance in recent years. This particularly holds true with the proliferation of portable electronic systems (e.g., tablet computers, smart phones, etc.) which utilize a battery as their primary power source. Thermal control in electronic systems (which is related to power consumption) has also taken on greater importance.

In typical processor-based systems, one or more operating voltages may be increased for larger processing workloads, and decreased for smaller processing workloads as well as for idle periods. Clock frequencies may also be increased or decreased according to processing workloads. Increasing the voltage and/or the clock frequency for a processor may result in greater power consumption and higher temperatures on the integrated circuit(s) used to implement a system. To manage power consumption and thermal output, many electronic systems implement power management control functions that may be hardware and/or software-based. In implementing these control functions, voltage, power and temperature safety margins may be utilized. These margins may set limits on the voltages, the amount of power consumed, and the on-die temperature of integrated circuits within the system. By enforcing these margins using the built-in control functionality, power consumption and thermal output of the system may be maintained within a safe operating envelope.

SUMMARY

A method and apparatus for providing telemetry for use in power control functions is disclosed. In one embodiment, a system includes an integrated circuit (IC) having a first power management circuit implemented thereon. The IC also includes a number of functional circuit blocks implemented within a number of different power domains on the IC. A second power management circuit is implemented external to the IC. The second power management circuit includes a number of voltage regulators, wherein each of the power domains is coupled to receive power from one of the voltage regulators. During operation, the first power management circuit may send commands requesting the change of one or more voltages provided to the IC. The second power management circuit may respond by performing the requested voltage change(s), and may also provide telemetry data to the first power management circuit. The second power management circuit may also provide telemetry data responsive to receiving a no operation command from the first power management circuit.

In one embodiment, a method includes a first power management circuit providing commands of various types to a second power management circuit, with the second power management circuit providing telemetry data to the first irrespective of the type of command. Accordingly, the second power management circuit may perform the requested function indicated by a received command, and may also provide telemetry data to the first power management circuit. The first power management circuit may use the received telemetry data to perform power control functions for functional circuit blocks implemented on the same IC die. The telemetry data may include (but is not limited to) power consumption data, current consumption data, and temperature data. The first power management circuit may perform control functions such as re-allocation of workloads among the functional blocks, clock gating/frequency changes, power gating, voltage changes (via requests to the second power management circuit), and so forth.

BRIEF DESCRIPTION OF THE DRAWINGS

The following detailed description makes reference to the accompanying drawings, which are now briefly described.

Figure 1:
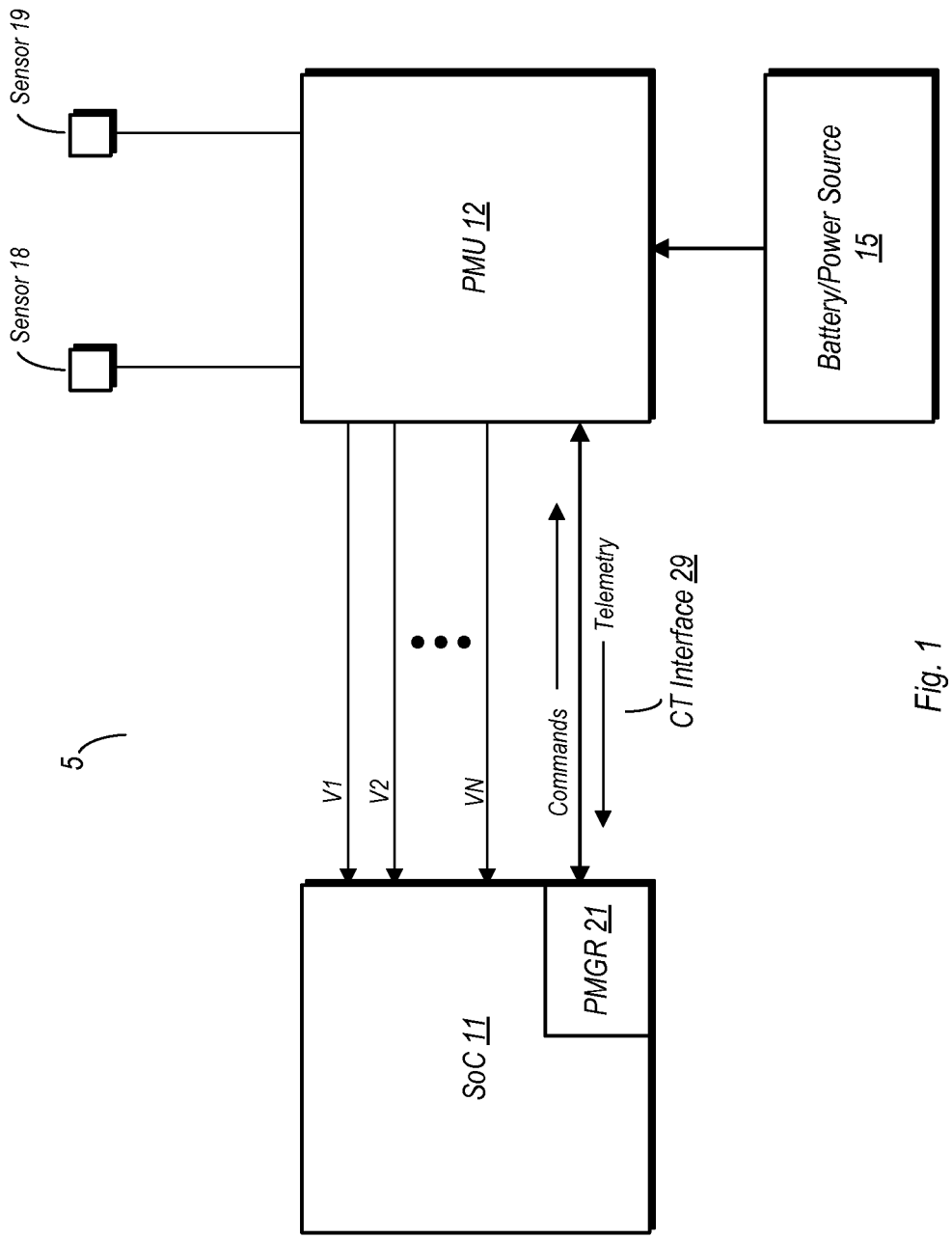
FIG. 1 is a block diagram of one embodiment of an exemplary system including a system-on-a-chip (SoC) and a second IC implementing a power management circuit.

While the disclosed subject matter is susceptible to various modifications and alternative forms, specific embodiments thereof are shown by way of example in the drawings and will herein be described in detail. It should be understood, however, that the drawings and detailed description thereto are not intended to limit the subject matter to the particular form disclosed, but on the contrary, the intention is to cover all modifications, equivalents and alternatives falling within the spirit and scope of the disclosed subject matter as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component.

DETAILED DESCRIPTION OF EMBODIMENTS

Turning now to FIG. 1, a block diagram of one embodiment of an exemplary system is shown. In the illustrated embodiment, system 5 includes a system-on-a-chip (SoC) 11 coupled to a power management unit (PMU) 12, both of which may be implemented as separate ICs. A power source 15 (which may be a battery, although other power sources are possible and contemplated) is coupled to provide power to a number of voltage regulators implemented on PMU 12. In turn, PMU 12 may provide supply voltages (e.g., V1, V2 . . . VN) to various power domains on SoC 11. These supply voltages, which may be adjustable, are received by various functional circuit blocks on SoC 11. Although not shown here, PMU 12 may also provide supply voltages to other circuitry within system 5.

PMU 12 is also coupled to sensors 18 and 19 in the embodiment shown. Additional circuitry associated with these sensors such as analog-to-digital converters (ADCs), amplifiers, and so forth, may be implemented within PMU 12. In one embodiment, sensors 18 and 19 are thermistors used to determine a system temperature. As is discussed below, the power consumption and accuracy of these sensors may be different from one another.

SoC 11 includes a power manager circuit (PMGR) 21, which may perform power management and performance level control functions on SoC 11. Among the functions performed by PMGR 21 is the initiation of supply voltage changes. This may be accomplished in the embodiment shown by sending a command from PMGR 21 to PMU 12 via command-telemetry (CT) interface 29. Various interface types (e.g., serial peripheral interface, or SPI) may be used to implement CT interface 29. The commands sent to PMU 12 over CT interface 29 may include a request to change a particular supply voltage, and may also include a value to which the voltage is to be changed. For example, in an effort to consume less power during times of low activity (but non-idle) of circuitry in a particular power domain, PMGR 21 may send a command to PMU 12 requesting the reduction of the corresponding supply voltage. PMU 12 may respond by changing the supply voltage to the specified value. PMGR 21 may also request that a particular voltage be turned off (when circuitry in the corresponding power domain is to be placed in a sleep mode) or turned on (when exiting the sleep mode). PMGR 21 may also perform various clock control functions, such as changing the frequency of a clock signal provided to a functional circuit block, or initiating clock gating (i.e. the inhibiting of a clock signal). More generally, PMGR 21 may control performance levels (or operating points) of the various functional circuit blocks of SoC 11 by causing the supply voltage and the frequency of a clock signal provided to a functional circuit block to be set at values that are commensurate with the current performance demands while also observing prescribed limits on power consumption and thermal output.

In addition to performing voltage change requests, PMU 12 may respond to commands received from PMGR 21 by providing telemetry data. The telemetry data may include such information as current consumption information, power consumption information, system temperature information, or any other measurable data. Thus, another function of PMU 12 in addition to those discussed above is the performance of various measurements that eventually results in the telemetry data. In one embodiment, PMU 12 may provide telemetry data to PMGR 21 irrespective of the type of command received. Accordingly, PMGR 21 may effectively request telemetry data from PMU 12 by sending a command thereto. If telemetry is desired but no other commands are to be sent, PMGR 21 may send a no operation (no-op) command to PMU 12, which may respond by providing telemetry data.

Figure 2:
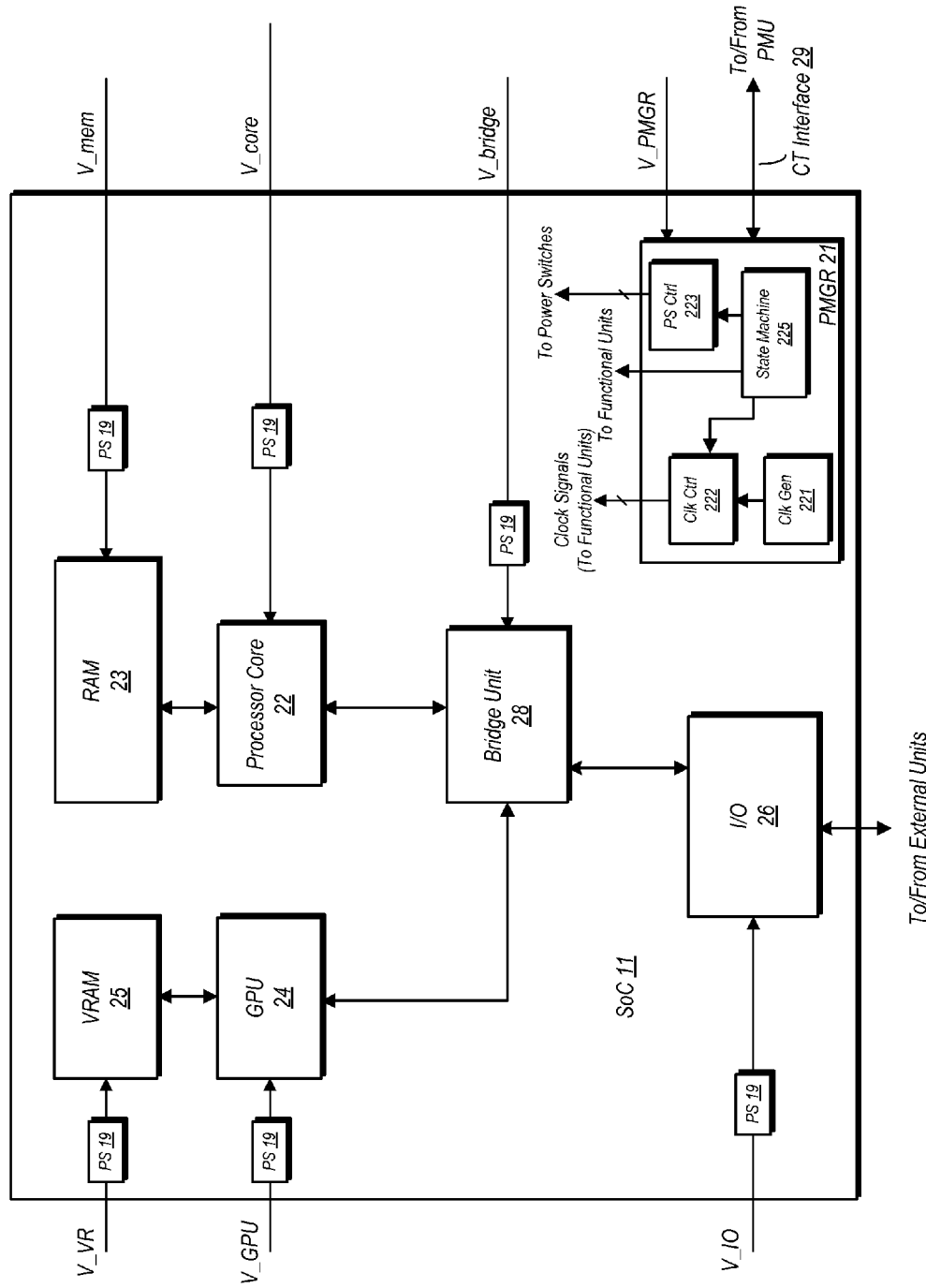
FIG. 2 is a block diagram illustrating one embodiment of an SoC.

FIG. 2 is a block diagram illustrating one embodiment of an SoC. It is noted that SoC 11 is representative of only one of many possible embodiments of an IC as discussed herein. Thus, SoC 11 is shown here for illustrative purposes, but is not intended to limit the scope of the disclosure.

In the embodiment shown, SoC 11 includes PMGR 21 as discussed above, along a number of functional circuit blocks. Among the functional circuit blocks included in this example of SoC 11 are processor core 22, graphics processing unit (GPU) 24, bridge unit 28, and input/output (I/O) unit 26. A random access memory (RAM) 23 is associated with processor core 22 in the embodiment shown, while a video RAM (VRAM) 25 is associated with GPU 24.

Each of the functional circuit blocks shown in FIG. 2 is coupled to receive a separate and unique supply voltage (e.g., V_GPU is provided to GPU 24, V_core is provided to processor core 22, etc.). Accordingly, each of the functional circuit blocks shown here are in different power domains with respect to on another. It is noted however that additional functional circuit blocks may be implemented in some power domains. For example, a second processor core 22 could be implemented and could also be coupled to receive V_core if it is desired that they both be in the same power domain.

In the embodiment shown, each of the functional circuit blocks is coupled to receive its respective supply voltage via a power switch (PS) 19. These power switches may be controlled by PMGR 21, and specifically, by PS control unit 223. Each of the power switches may include one or more switches that, when active, couple their respective functional circuit block to their respective supply voltage. PMGR 21 may initiate power gating (i.e. turning off power) of the various functional circuit blocks through PS control unit 223, e.g., when a block is to be placed into a sleep mode. Power gating for a particular functional block may be performed by de-activating its corresponding PS 19. In some embodiments, multiple functional circuit blocks are implemented within the same power domain. In these instances, additional separate power switches may be provided for each of the functional circuit blocks within the power domain so that they may be power gated independently of one another.

PMGR 21 in the embodiment shown also includes a clock generation unit 221 and a clock control unit 222. Clock generation unit 221 may include one or more circuits configured to generate periodic signals. These circuits may include phase locked loops (PLLs), oscillators, and the like. The periodic signal or signals may be used to generate one or more corresponding clock signals that may then be provided to clock control unit 222. Clock control unit 222 may include circuits such as PLLs, frequency dividers and/or multipliers, and clock gating circuits. The functions performed by clock control circuit 222 in the embodiment shown include distribution of clock signals to the various functional circuit blocks of SoC 11, as well as controlling their respective frequencies. In some embodiments, clock signals may be distributed to the various clock consumer circuits in the various functional circuit blocks via a clock tree having a root node and a number of leaf nodes. In such embodiments, clock gating (i.e. inhibiting a clock signal from being provided) may be performed at a root node level and/or a leaf node level. Accordingly, clock control circuit 222 may perform clock gating at least at the root level. In some embodiments having a clock tree, clock control circuit may generate control signals for clock gating at a leaf node level, although in alternate embodiments, leaf node level clock gating may be performed based on locally generated control signals.

State machine 225 of PMGR 21 in the embodiment shown is a processing circuit configured to perform various power control functions. More particularly, state machine 225 in the embodiment shown is configured to perform functions that balance power consumption with performance requirements in order to optimize the amount of performance per watt of power consumed. As such, state machine 225 may initiate changes to the frequencies of the various clock signals as well as initiating changes to the voltages provided to the various functional circuit blocks. State machine 225 may also initiate clock gating and/or power gating at various times (e.g., when a given functional circuit block is idle). In some embodiments, state machine 225 may also be configured to re-allocate workloads among the various functional circuit blocks. For example, in an embodiment having multiple processor cores, state machine 225 may allocate the workload of one processor core to another.

State machine 225 may utilize data from various sources in determining which power control functions are to be performed. This data includes the telemetry data received from PMU 12 via CT interface 29. As previously noted, PMU 12 may provide various types of telemetry data, such as system temperature information, current consumption information (e.g., total, or per power domain), voltages provided to the various functional circuits of SoC 11, and power consumption information (e.g., total, or per power domain). Additionally, state machine 225 may be configured to receive localized temperature information from temperature sensors implemented on SoC 11 itself. Using the information from these various sources, state machine 225 may perform the various power control functions discussed above in order to manage performance, power consumption, and thermal output.

Figure 3:
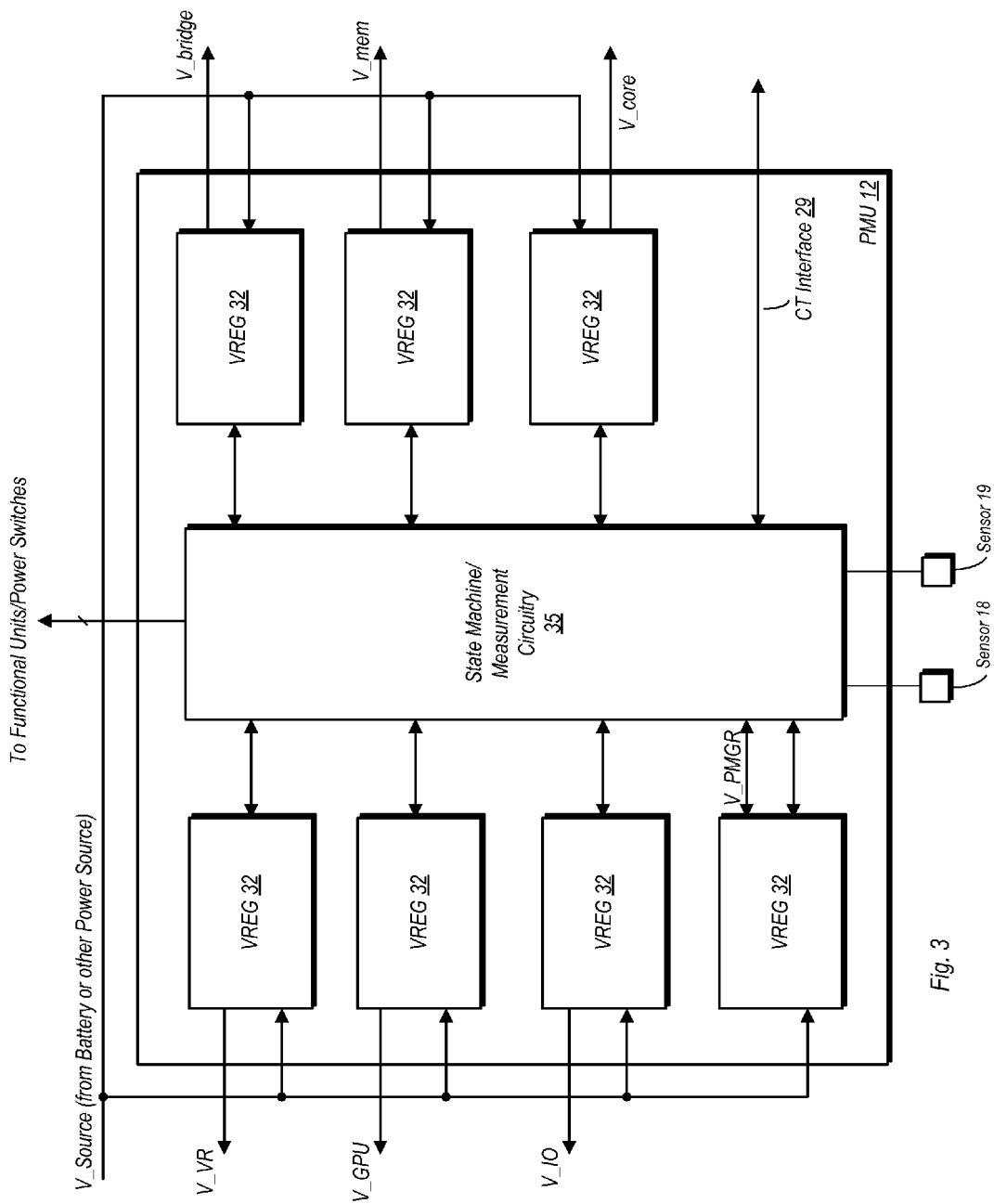
FIG. 3 is a block diagram illustrating one embodiment of a power management circuit implemented on an IC.

FIG. 3 is a block diagram illustrating one embodiment of a power management circuit implemented on an IC. PMU 12 in the embodiment shown is implemented on an IC that is separate from that used to implement SoC 11. PMU 12 includes a number of voltage regulators 32, each of which is coupled to receive a source voltage, V_source, and is configured to output a supply voltage. In this particular example, the supply voltages are generated for the various functional circuit blocks/power domains on SoC 11, although it is possible and contemplated that PMU 12 includes additional voltage regulators configured to generate supply voltages for other components in system 5. Moreover, PMU 12 in the embodiment shown includes one voltage regulator 32 configured to generate a supply voltage, V_PMGR, for state machine 35 on the same die.

The voltage regulators 32 may be implemented as any suitable type. In one embodiment, the voltage regulators may be implemented as buck converters. It is further noted that different types of voltage regulators 32 may be implemented on the same die. For example, one or more voltage regulators 32 may be implemented as buck converters, while one or more additional voltage regulators 32 may be implemented as boost converters. In this particular embodiment, it is contemplated that V_Source is a DC (direct current) voltage, and thus each of voltage regulators 32 are DC-DC converters. However, embodiments are possible and contemplated in which V_Source is an AC (alternating current) voltage, and thus the corresponding voltage regulators 32 could be configured to convert the AC voltage into a DC voltage.

State machine 35 in the embodiment shown is a processing circuit configured to perform various power control/management functions. As previously noted, PMU 12 is configured to provide telemetry data to PMGR 21 of SoC 12. The telemetry data may be generated using information input into state machine 35. In the embodiment shown, state machine 35 is coupled to receive information from each of voltage regulators 32. The received information may include a measured output current as well as a measured output voltage. In order to provide such information to state machine 35, the various voltage regulators 32 may be augmented with circuitry for measuring their respectively supplied output voltage and current. In some embodiments, state machine 35 may calculate the output power provided by a given voltage regulator 32 based on the received output current and output voltage information. State machine 35 may also receive system temperature information from sensors 18 and 19. Using the received temperature, voltage, and current information, state machine 35 may generate telemetry data to be provided to PMGR 21 on SoC 11. Generally speaking, measurements used to generate various telemetry data may be performed internally or externally to PMU 11, depending on the embodiment.

With respect to temperature, state machine 35 may switch between temperature sensors 18 and 19 at various times during operation. In the embodiment shown, temperature sensor 18 may be less accurate than temperature sensor 19. For example, temperature sensor 18 may be a coarse grain temperature sensor having an accuracy of ±10%, while temperature sensor 19 may be a fine grain temperature sensor having an accuracy of ±1%. Furthermore, operation of the lower accuracy coarse grain temperature sensor 18 may consume less power than operation of the higher accuracy fine grain temperature sensor 19. State machine 35 may include additional circuitry, such as amplifiers, analog-to-digital converters (ADCs), and so forth, to support operation of one or both of temperature sensors 18 and 19. During operation of the system, state machine 35 may determine which of the sensors to be operated based on a sensed temperature and a first temperature threshold value. If the temperature is less than the first temperature threshold, state machine 35 may utilize the low power, less accurate temperature sensor 18. When the temperature is greater than the first temperature threshold, state machine 35 may utilize the higher power, more accurate temperature sensor 19. The first temperature threshold may represent a temperature that is reasonably close to a second temperature threshold at which thermal control actions may be desired in order to maintain operation of system 5 within prescribed thermal limits. Thus, when the system temperature is well below the second temperature threshold, the low power less accurate temperature sensor 18 may be used. When the system temperature is reasonably close to the second temperature threshold (i.e. greater than or equal to the first temperature threshold), the temperature sensor 19 may be utilized in order to obtain more accurate temperature readings. If the temperature is determined to exceed the second threshold, one or more actions may be taken to cause SoC 11 to reduce its power consumption and thus reduce its contribution to the system thermal output.

More generally, various embodiments of state machine 35 may utilize different sensors based on a system parameter (e.g., power consumption by one or more of the functional circuit blocks, etc.) and the value of that system parameter relative to a predefined threshold value. The low power, less accurate coarse grain sensor may be utilized when the current value of the system parameter is significantly distant from another threshold in which a power, thermal, or performance control action is desirable. When the current value of the system parameter is close to the threshold at which action is desirable, the more accurate, higher power fine grain sensor may be utilized. In either case, the sensor that is not currently in use and its associated circuitry in PMU 12 may be powered down.

Figure 4:
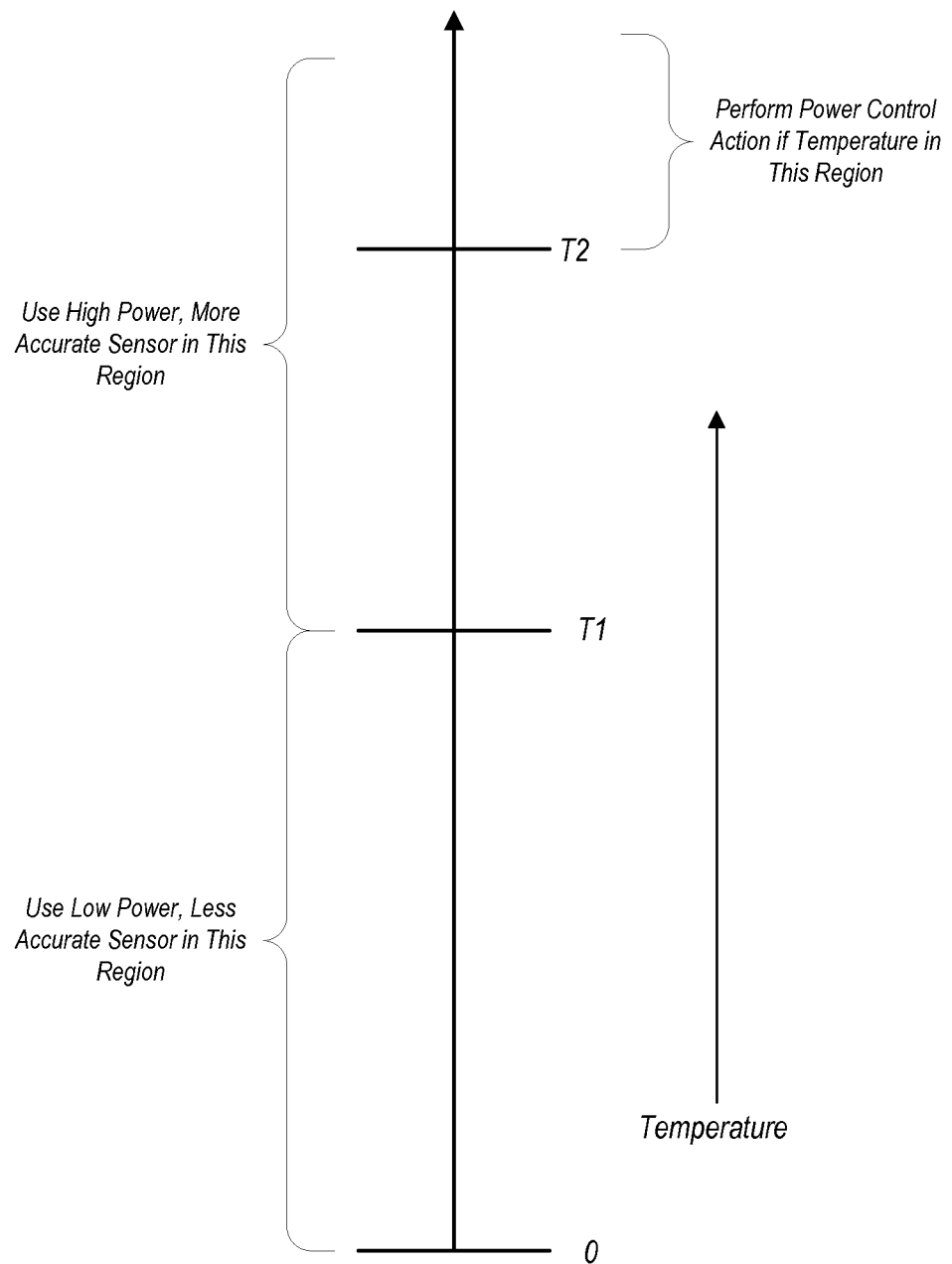
FIG. 4 is a graphic illustration of the operation of one embodiment of a power management circuit with regard to a sensed system temperature.

The utilization of different sensors (and associated circuitry) depending on the value of the sensed parameter is illustrated graphically in FIG. 4. The illustrated example is directed to an embodiment in which different temperature sensors are utilized depending on the currently sensed temperature value. If the currently sensed temperature is less than temperature threshold T1, the low power, less accurate temperature sensor may be utilized. If the higher power, more accurate temperature sensor initially senses that the temperature has fallen below T1, PMU 12 may switch to the low power, less accurate sensor while powering down the higher power sensor. When the temperature is greater than T1, the higher power temperature sensor may be utilized. If the initial sensing of the temperature above T1 is performed by the low power sensor, PMU 12 may switch operation to the high power sensor. At temperature T2 or above, one or more power control actions may be taken by PMGR 21, PMU 12, or both, in order to prevent the system from exceeding prescribed thermal limits.

Returning to FIG. 3, state machine 35 in the embodiment shown may execute commands received from PMGR 21 of SoC 11. PMGR 21 may initiate changes to the supply voltage received by the various functional circuit blocks of SoC 11 by sending requests, in the form of commands, to state machine 35 of PMU 12. State machine 35 of PMU 12 may respond by changing the requested supply voltage to the requested value (in addition to sending telemetry data to PMGR 21). For example, PMGR 21 may convey a command requesting an increase in the supply voltage V_bridge to s specified value, with state machine 35 responding by performing the requested change.

In some embodiments, a change of one supply voltage may render it desirable to change another. For example, if the supply voltage provided to GPU 24, V_GPU, is to be changed to a requested value, it may also be desirable to change the supply voltage provided to VRAM 25, V_VR. Accordingly, PMGR 21 may convey a command requesting a concurrent change to these two supply voltages to state machine 35 of PMU 12. Responsive thereto, state machine 35 may cause a concurrent change to these two supply voltages. In general, changing two supply voltages concurrently may reduce any disruption in performance that may occur relative to an embodiment in which the two supply voltages are changed sequentially.

Figure 5:
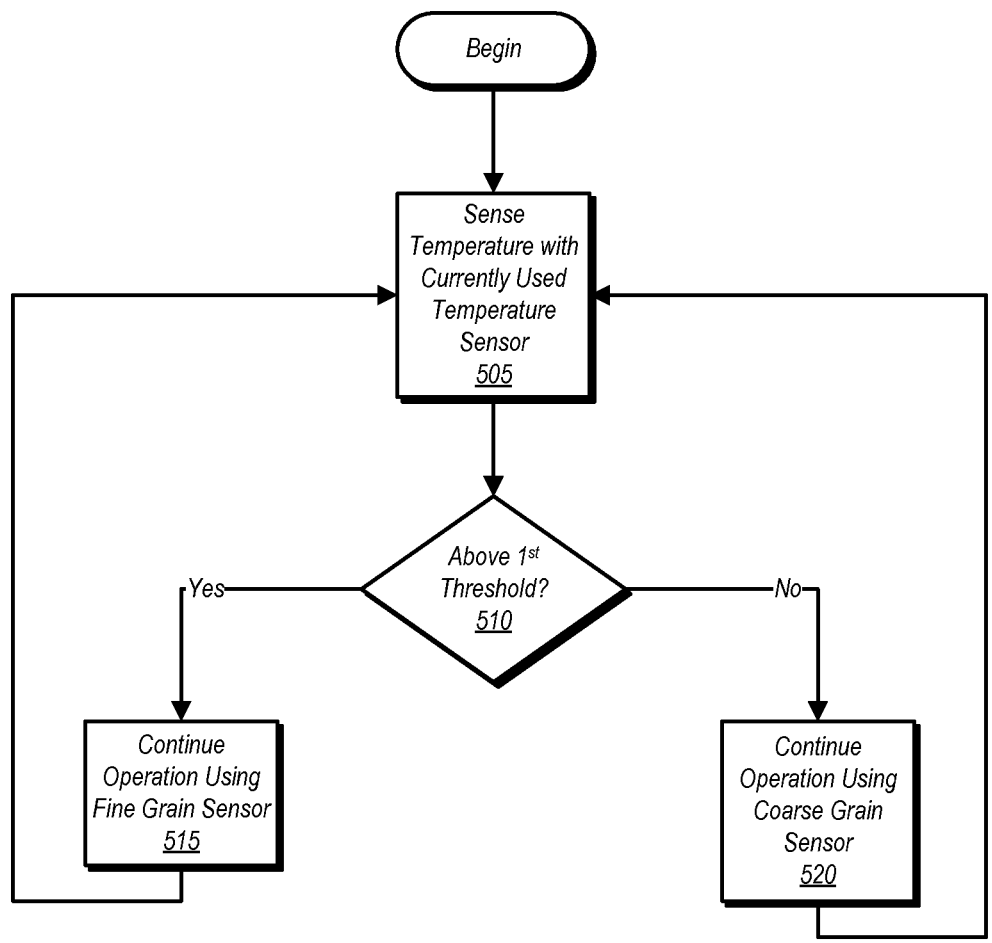
FIG. 5 is a flow diagram illustrating the operation of one embodiment of a power management circuit with regard to a sensed system temperature.

FIG. 5 is a flow diagram illustrating the operation of one embodiment of a power management circuit with regard to a sensed system temperature. Method 500 may be performed using various embodiments of the circuitry discussed above. It is also possible and contemplated that method 500 be performed with other circuit and/or software embodiments not explicitly discussed herein. Furthermore, while the exemplary method is directed to sensing temperatures, alternate embodiments of the methodology may be directed to other parameters.

Method 500 begins with the sensing of a temperature using a currently used temperature sensor (block 505). The currently used temperature sensor may be one of at least two temperature sensors, such as temperature sensors 18 and 19 shown in FIG. 3, wherein a first temperature sensor 19 is more accurate (referred to herein as a "fine grain" temperature sensor) than the second temperature sensor 18 (referred to herein as a "coarse grain temperature sensor"). The first temperature sensor may also consume a greater amount of power than the second temperature sensor.

If the detected temperature is above a first temperature threshold (block 510, yes), then operation may continue using the first, fine-grain temperature sensor (block 515). The first threshold may be a predetermined temperature at which operation may be switched between the coarse- and fine-grain temperature sensors. If the sensor that detected the temperature above the first threshold was the coarse-grain temperature sensor, then operation may switch to utilization of the fine-grain temperature sensor. When the system is operating using the fine-grain temperature sensor, the coarse-grain temperature sensor and at least some circuits associated therewith may be powered down.

If the detected temperature is less than the first temperature threshold (block 510, no) then operation may continue using the second, coarse-grain temperature sensor (block 520). If the sensor that detected the temperature below the first threshold was the fine-grain sensor, then operation may switch to utilization of the coarse-grain temperature sensor. When the system is operating using the coarse-grain temperature sensor, the fine-grain temperature sensor and at least some circuits associated therewith may be powered down.

Irrespective of which sensor is currently being used and irrespective of whether operation was changed from one sensor to the other, method 500 returns to block 505 from block 515 and block 520. Temperature readings at block 505 may occur periodically or continuous monitoring of the temperature may be performed.

Figure 6:
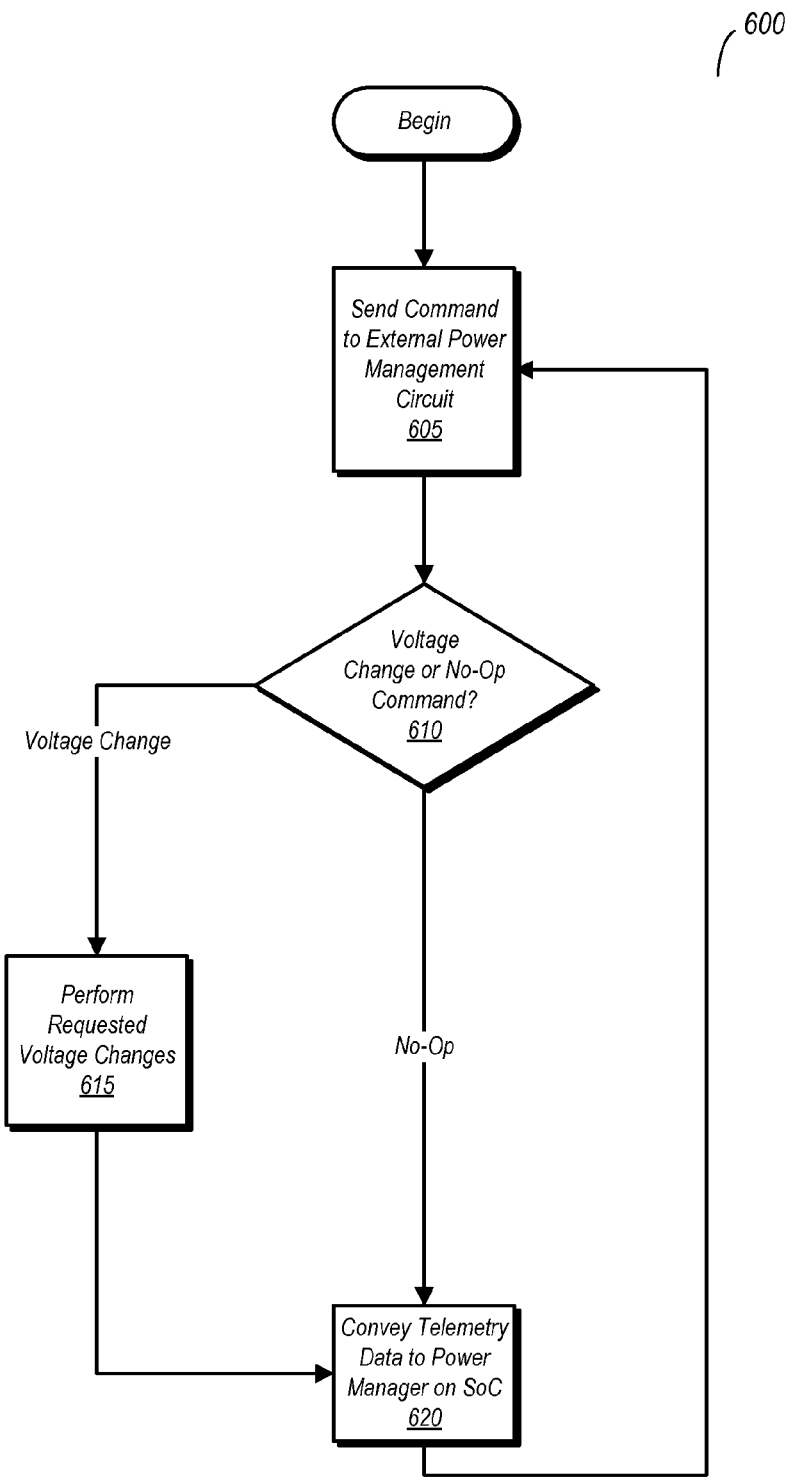
FIG. 6 is a flow diagram illustrating the operation of one embodiment of a system in which a power manager on an SoC receives telemetry data from a power management circuit external to the SoC.

FIG. 6 is a flow diagram illustrating the operation of one embodiment of a system in which a power manager on an SoC receives telemetry data from a power management circuit external to the SoC. Method 600 may be performed using various embodiments of the circuitry discussed above. It is also possible and contemplated that method 600 be performed with other circuit and/or software embodiments not explicitly discussed herein. Furthermore, while the exemplary method is directed to sensing temperatures, alternate embodiments of the methodology may be directed to other parameters.

Method 600 begins with the sending of a command to an external power management circuit (block 605). Using the circuit examples discussed above in FIGS. 1-3, the sending of the command maybe performed by PMGR 21, while the command may be received by PMU 12. If the command is a request for a voltage change (block 610, Voltage Change), then PMU 12 may perform the requested voltage change or changes (block 615). The PMU 12 may convey telemetry data to the PMGR 21, either concurrently or subsequently to the change of voltage or voltages (block 620). If the command is a no-operation command (block 610, No-Op), the PMU 12 may nevertheless respond to the command by conveying telemetry data to PMGR 21 on SoC 11 (block 620). Thereafter, the method returns to block 605.

Figure 7:
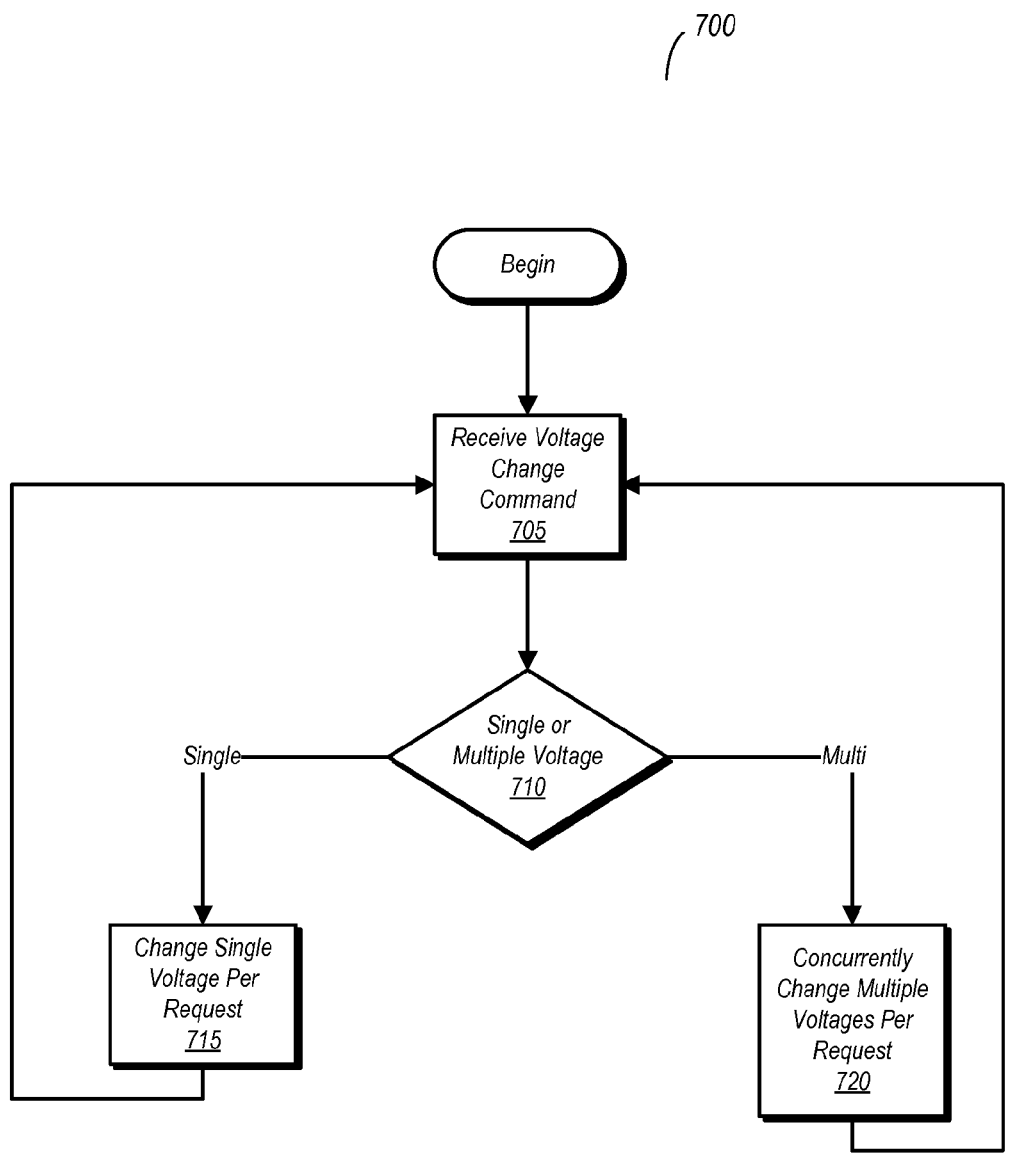
FIG. 7 is a flow diagram further illustrating the operation of one embodiment of a system in which a power management circuit changes voltages provided to an SoC.

FIG. 7 is a flow diagram further illustrating the operation of one embodiment of a system in which a power manager on an SoC receives telemetry data from a power management circuit external to the SoC. Method 700 may be performed using various embodiments of the circuitry discussed above. It is also possible and contemplated that method 700 be performed with other circuit and/or software embodiments not explicitly discussed herein.

Method 700 begins with the receipt of a voltage change command (block 705). Using the circuitry discussed above as an example, PMGR 21 of SoC 11 may send a voltage change command to PMU 12. The command may request a change to a single voltage, or may request a change to multiple voltages. For example, a command to change a single voltage may be a request the change of the supply voltage provided to I/O unit 26, V_IO. In another example, a command to change multiple voltages may be a request to change the supply voltages provided to processor core 22 and RAM 23, V_core and V_mem, respectively.

If the voltage change command requests a change to a single voltage (block 710, Single), then PMU 12 may change the single supply voltage per the request (block 715). If the voltage change command requests a change to multiple voltages (block 710, Multi), then PMU 12 may concurrently change the multiple voltages per the request (block 720). After blocks 715 and 720, the method may return to block 705 upon receipt of the next voltage change command.

Figure 8:
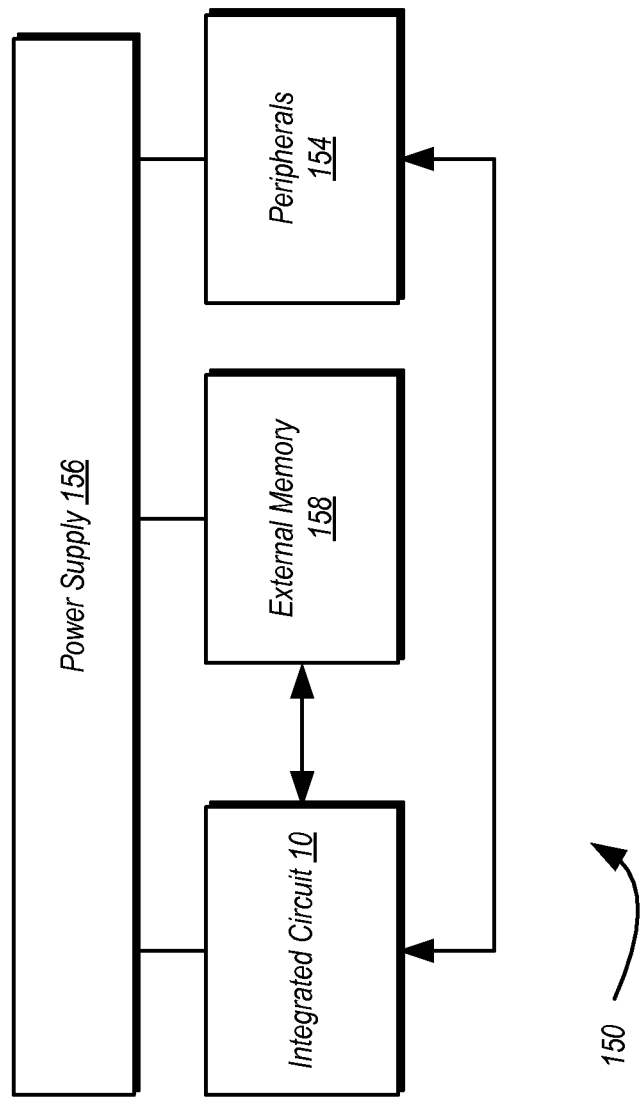
FIG. 8 is a block diagram of another embodiment of an exemplary system.

Turning next to FIG. 8, a block diagram of one embodiment of a system 150 is shown. In the illustrated embodiment, the system 150 includes at least one instance of the integrated circuit 10 coupled to external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. A system comprising:
an integrated circuit (IC) having a plurality of functional circuit blocks and a first power management circuit implemented thereon, wherein the first power management circuit is configured to perform power control functions for the plurality of functional circuit blocks on the IC;
a second power management circuit external to the IC, wherein the second power management circuit is coupled to the first power management circuit via a first interface and is configured to provide telemetry data to the first power management circuit, via the first interface, responsive to receiving a command from the first power management circuit via the first interface, irrespective of the type of command received from the first power management circuit.

2. The system as recited in claim 1, wherein the telemetry data includes system temperature data.

3. The system as recited in claim 1, wherein the telemetry data includes data indicative of power consumption by at least one functional circuit block in the integrated circuit.

4. The system as recited in claim 1, wherein the telemetry data includes data indicative of current consumption by at least one functional circuit block in the integrated circuit.

5. The system as recited in claim 1, wherein the first power management circuit is configured to send to the second power management circuit commands requesting a change of at least one voltage, and wherein the second power management circuit is configured to change the at least one voltage and provide the telemetry data to the first power management circuit responsive to the request.

6. The system as recited in claim 5, wherein the first power management circuit is configured to send to the second power management circuit commands requesting that two voltages be changed concurrently, and wherein the second power management circuit is configured to change the two voltages concurrently and provide the telemetry data to the first power management circuit responsive to the request.

7. The system as recited in claim 1, wherein the first power management circuit is configured to send a no operation command to the second power management circuit, and wherein the second power management circuit is configured to provide the telemetry data to the first power management circuit responsive to receiving the no operation command.

8. The system as recited in claim 1, wherein the integrated circuit includes a plurality of voltage domains, wherein each of the plurality of functional circuit blocks is in one of the plurality of voltage domains, and wherein the second power management circuit includes a plurality of voltage regulator circuits each configured to provide voltage to a corresponding one of the plurality of voltage domains.

9. The system as recited in claim 1, wherein the first power management circuit is configured to set one or more performance parameters for one or more of the plurality of functional circuit blocks based on the telemetry data received from the second power management circuit.

10. A method comprising:
conveying commands from a first power manager implemented on a first integrated circuit, through a first interface, to a second power manager implemented on a second integrated circuit;

conveying telemetry data from the second power manager to the first power manager, through the first interface, responsive to receiving the commands irrespective of a type of command received;

the first power manager performing power control functions for one or more of a plurality of functional circuit blocks on the first IC responsive to receiving the telemetry data.

11. The method as recited in claim 10, wherein the telemetry data includes one or more of the following:

information indicative of temperature data for a system in which the first and second integrated circuits are implemented;

information indicative of current consumption for one or more of the plurality of functional circuit blocks;

information indicative of power consumption for one or more of the plurality of functional circuit blocks; and information indicative of a voltage level of one or of the plurality of functional circuit blocks.

12. The method as recited in claim 10, further comprising:

the first power manager conveying, to the second power manager, a command indicative of a request to change at least one voltage provided to at least one of the plurality of functional circuit blocks;

the second power manager changing the at least one voltage responsive to receiving the command; and the second power manager providing the telemetry data responsive to receiving the command.

13. The method as recited in claim 12, further comprising:

the first power manager conveying, to the second power manager, a command indicative of a request to concurrently change two voltages, wherein a first of the two voltages is provided to a first of the plurality of functional circuit blocks and wherein a second of the two voltages is provided to a second of the plurality of functional circuit blocks; and the second power manager concurrently changing the two voltages; and the second power manager providing the telemetry data responsive to receiving the command.

14. The method as recited in claim 10, further comprising:

the first power manager conveying a no operation command to the second power manager;

the second power manager providing the telemetry data to the first power manager responsive to receiving the no operation command.

15. An apparatus comprising:

a first integrated circuit including a first power manager implemented thereon, wherein the first integrated circuit includes a plurality of functional circuit blocks, wherein each of the plurality of functional circuit blocks is implemented in one of a plurality of power domains;

a second integrated circuit including a second power manager and plurality of voltage regulators each coupled to provide power to a corresponding one of the plurality of power domains, wherein the second power manager is coupled to receive commands from the first power manager through a first interface and is configured to provide telemetry data through the first interface to the first power manager responsive to receiving the commands and irrespective of a type of command received.

16. The apparatus as recited in claim 15, wherein the telemetry data includes one or more of the following:

information indicative of temperature data for a system in which the first and second integrated circuits are implemented;

information indicative of current consumption for one or more of the plurality of functional circuit blocks;

information indicative of power consumption for one or more of the plurality of functional circuit blocks;

information indicative of a voltage level of one or of the plurality of functional circuit blocks.

17. The apparatus as recited in claim 15, wherein the first power management unit is configured to determine a performance state for one or more of the plurality of functional circuit blocks based on the telemetry data.

18. The apparatus as recited in claim 15, wherein the first power management unit is configured to convey, to the second power management unit:

commands of a first type, wherein the second power management unit is configured to change a voltage provided to one of the power domains responsive to receiving a command of the first type; and commands of a second type, wherein the second power management unit is configured to concurrently change voltages provided to two of the power domains responsive to receiving a command of the second type;

wherein the second power management unit is further configured to provide the telemetry data to the first power management unit responsive to receiving commands of the first type and responsive to receiving commands of the second type.

19. The apparatus as recited in claim 15, wherein the first power management unit is configured to convey a no operation command to the second power management unit, wherein the second power management unit is configured to provide the telemetry data to the first power management unit responsive to receiving the no operation command.

* * * * *